(12) United States Patent
Norris (10) Patent No.: US 12,048,384 B2
(45) Date of Patent: Jul. 30, 2024

(54) TEMPERATURE REDUCING SYSTEMS AND METHODS

(71) Applicant: Eric Norris, Milwaukee, WI (US)

(72) Inventor: Eric Norris, Milwaukee, WI (US)

(*) Notice: Subject to any disclaimer, the term of this patent is extended or adjusted under 35 U.S.C. 154(b) by 614 days.

(21) Appl. No.: 17/317,552

(22) Filed: May 11, 2021

(65) Prior Publication Data

US 2022/0361696 A1 Nov. 17, 2022

(51) Int. Cl.
| | |
|---|---|
| *A47G 19/26* | (2006.01) |
| *A23L 3/00* | (2006.01) |
| *A23L 3/36* | (2006.01) |
| *A47G 23/04* | (2006.01) |
| *G05D 23/19* | (2006.01) |

(52) U.S. Cl.
CPC .............. *A47G 19/26* (2013.01); *A23L 3/001* (2013.01); *A23L 3/363* (2013.01); *A47G 23/04* (2013.01); *G05D 23/19* (2013.01); *A23V 2002/00* (2013.01); *A47G 2200/166* (2013.01)

(58) Field of Classification Search
CPC ... A47G 23/04; A47G 2200/166; A23L 3/001; A23L 5/00
See application file for complete search history.

(56) References Cited

U.S. PATENT DOCUMENTS

| | | | |
|---|---|---|---|
| 6,295,820 B1 | 10/2001 | Cauchy et al. | |
| 8,347,781 B2 | 1/2013 | Stack | |
| 10,337,790 B2* | 7/2019 | Sato | F25D 29/003 |
| 2019/0254298 A1 | 8/2019 | Carballo | |

FOREIGN PATENT DOCUMENTS

WO WO-2007/052907 5/2007

OTHER PUBLICATIONS

Traulsen, Quick Chiller, 2019, https://www.traulsen.com/products/blast-chillers/quick-chiller (pp. 1-2).
Wikihow Staff, "How to Cool Food Quickly", Jul. 1, 2020, https://www.wikihow.com/Cool-Food-Quickly (pp. 1-6).

* cited by examiner

*Primary Examiner* — Ko-Wei Lin
(74) *Attorney, Agent, or Firm* — FOLEY & LARDNER LLP (57) ABSTRACT

An apparatus for cooling a food item may include a base and a top, the top and the base defining an interior chamber configured to receive the food item, and a fan coupled to the top and configurable in an operating mode and an off mode, wherein the fan moves air within the interior chamber when in the operating mode. The apparatus may include a temperature sensor to measure a temperature of the food item within the interior chamber and provide a temperature signal representative of that temperature, at least one user input allowing a user to select a cooling parameter, and a control unit adapted to receive the temperature signal and the cooling parameter, wherein the control unit is configured to switch the fan from the operating mode to the off mode when the cooling parameter has been met.

20 Claims, 12 Drawing Sheets

TEMPERATURE REDUCING SYSTEMS AND METHODS

BACKGROUND

The present invention relates to methods and devices for preparing food and particularly to methods and devices for cooling a food item.

Often when food is served its temperature is too high for immediate consumption. Many people, such as the children or the elderly may also be more sensitive to temperature then others and desire their food to be served at a cooler temperature. In either case, it can be inexpedient to wait for the food to cool naturally, and other methods may be used to accelerate the process. For example, the consumer may sometimes blow on the food, however this approach has a number of drawbacks. The same people who are temperature sensitive are also more likely to lack the appropriate lung capacity or stamina to blow on food hard enough and long enough for the temperature to lower to a more palatable degree. The consumer may also wish to avoid blowing on their food in the company of others, as they may inadvertently breath on those around them. Many also do not have access to or may desire to avoid other methods of cooling food such as the use of refrigerators or blast chillers. Such devices are generally designed to cool food far below the desired temperature for consumption. They may also alter the humidity of the air surrounding the food item and consequently change the food in undesired ways. For many consumers it may also be inconvenient to leave room in a refrigerator for whenever a serving of food needs cooling, and in general putting hot food in a refrigerator may result in increased wear on the refrigerator's components as it is forced to respond to the increased internal temperature that results.

In view of the above, it is an object of the invention to provide an improved method and device for cooling food to be served to a desired temperature that is simple and easy to operate.

SUMMARY OF THE INVENTION

One embodiment of the invention relates to an apparatus for cooling a food item. The apparatus includes a base and a top, the base and the top defining an interior chamber configured to receive the food item. The apparatus also includes a fan coupled to the top and configurable in an operating mode and an off mode, wherein the fan moves air within the interior chamber when in the operating mode, as well as a temperature sensor configured to measure a temperature of the food item within the interior chamber and provide a temperature signal representative of the temperature of the food item. The apparatus further includes at least one user input allowing a user to select a cooling parameter, and a control unit adapted to receive the temperature signal from the temperature sensor and the cooling parameter from the at least one user input, wherein the control unit is configured to switch the fan from the operating mode to the off mode when the cooling parameter has been met.

Another embodiment relates to a method for cooling a food item. The method includes placing a food item in an apparatus for cooling it. The apparatus includes a base and a top, the base and the top defining an interior chamber configured to receive the food item. The apparatus also includes a fan coupled to the top and configurable in an operating mode and an off mode, wherein the fan moves air within the interior chamber when in the operating mode, as well as a temperature sensor configured to measure a temperature of the food item within the interior chamber and provide a temperature signal representative of the temperature of the food item. The apparatus further includes at least one user input allowing a user to select a cooling parameter, and a control unit adapted to receive the temperature signal from the temperature sensor and the cooling parameter from the at least one user input, wherein the control unit is configured to switch the fan from the operating mode to the off mode when the cooling parameter has been met. The method further includes selecting a cooling parameter for the food item by the at least one user input, and switching the fan from the operating mode to the off mode when the cooling parameter is met.

The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, a food-cooling device includes a cooling unit (e.g., a fan) within an interior chamber defined by a base and a top. The food-cooling device may be capable of sensing the temperature of a food item placed within the interior chamber and initiating a cooling operation. The cooling operation including the fan may be controlled by an electronic control unit that is configured to receive a user input (e.g., a desired temperature, a run time, a power on signal, etc.) and operate switch the fan between an operating mode and an off mode The top may include holes or slits to allow air to move between the interior chamber and the surrounding environment and the top may be connected to the base with a hinge, which may also include a locking mechanism controlled by the electronic control unit so that the top is locked in place when the fan is running.

Figure 1:
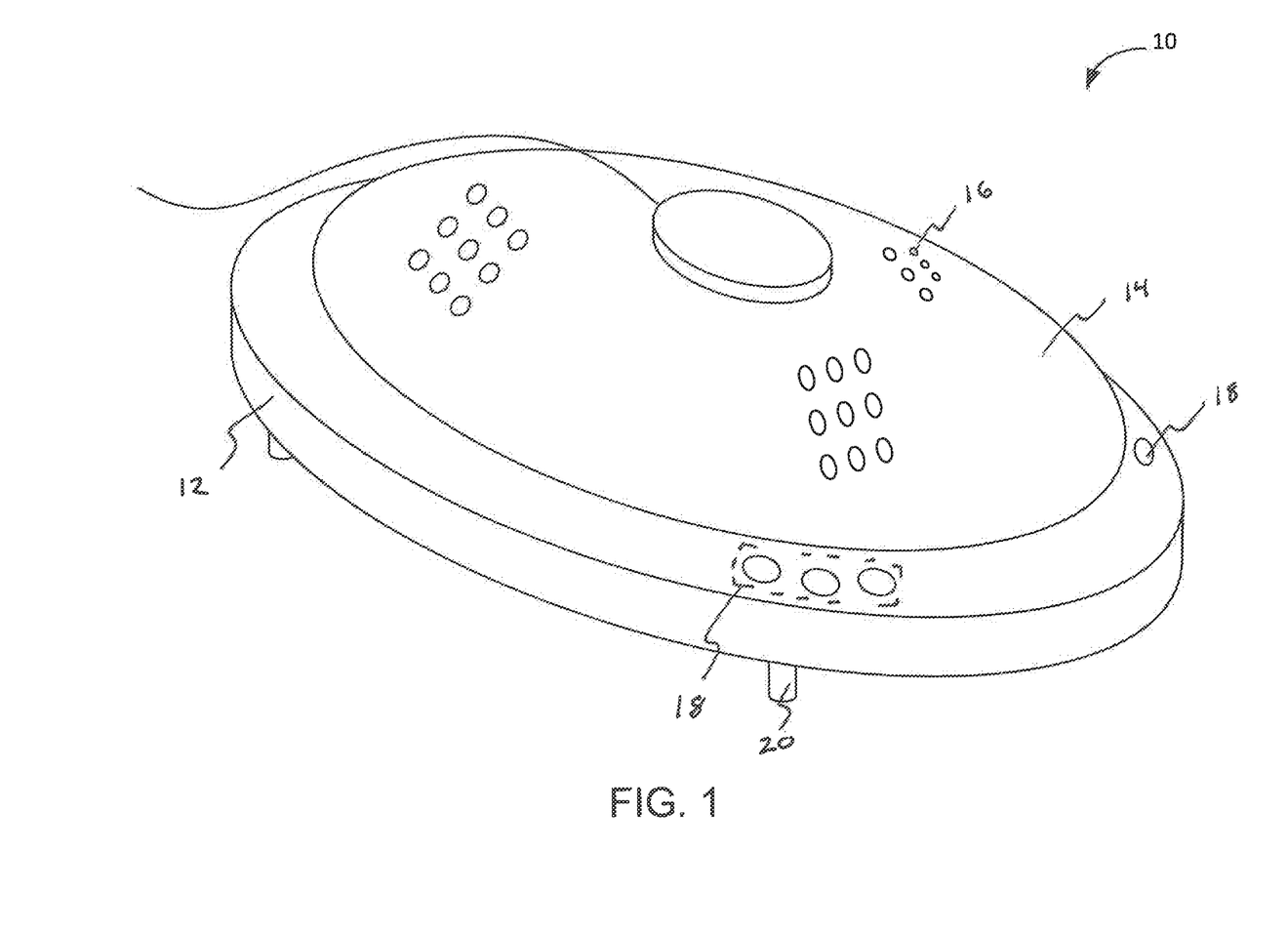
FIG. 1 is a perspective view of a food-cooling device, according to an exemplary embodiment.
Figure 2:
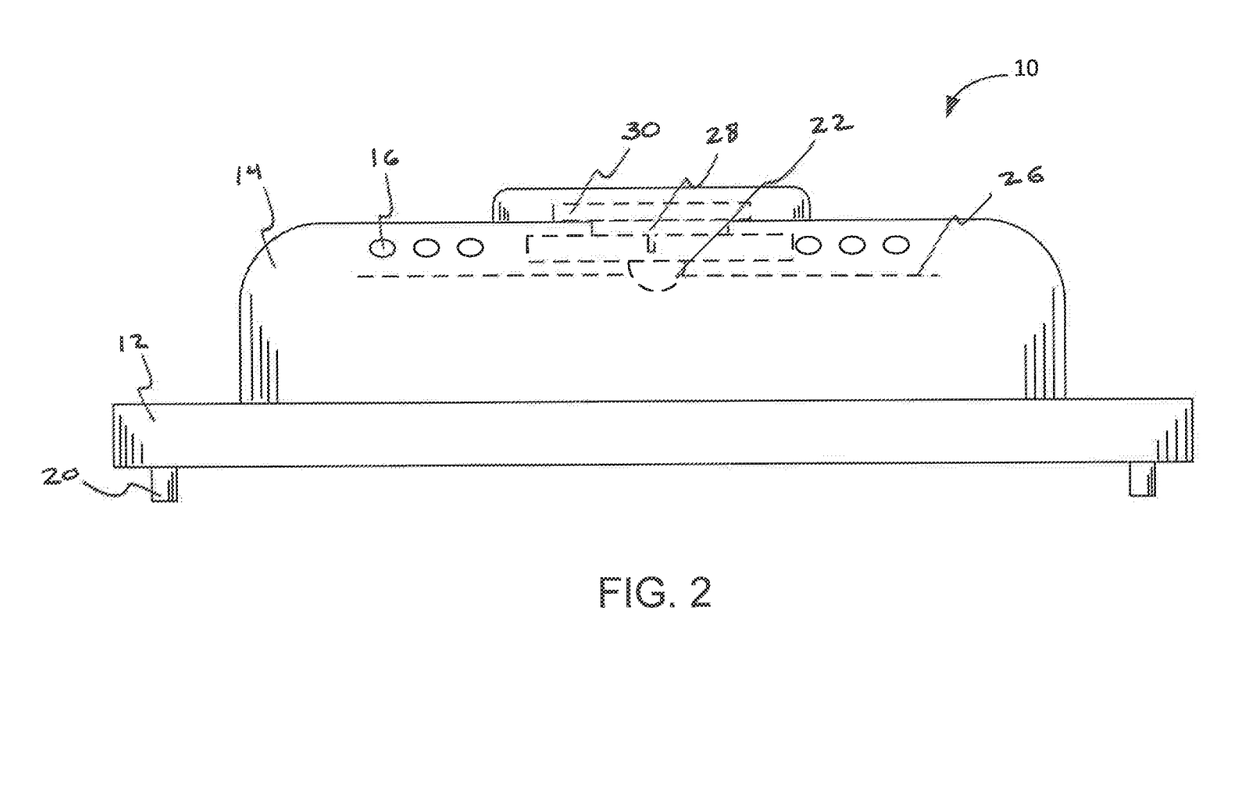
FIG. 2 is a front view of a food-cooling device, according to an exemplary embodiment.

According to the exemplary embodiment shown in FIGS. 1-8, a food-cooling device, shown as food-cooling device 10, includes a base or a bottom, shown as base 12 and a top, shell, cover, or a lid, shown as top 14. The base 12 and the top 14 combine to define an interior chamber 100. According to an exemplary embodiment, the base 12 and the top 14 are made from a non-metallic material. As shown in FIG. 1 the base 12 and the top 14 are circular in shape. In other embodiments, the base 12 and the top 14 are shaped otherwise (e.g., square, rectangular, etc.). As shown in FIG. 1, the base 12 and top 14 are sized to accommodate a standard dinner plate. In other embodiments, the base 12 and the top 14 may be sized to fit a cafeteria tray. According to an exemplary embodiment, the top 14 additionally and/or alternatively is tall enough so that the interior chamber, defined by the base 12 and the top 14, shown in FIGS. 4-6, may accommodate a standard-sized bowl. In other embodiments, the base 12 and the top 14 are sized otherwise (e.g., to fit various shapes and sizes of dishes). For example, referring now specifically to FIG. 4, the top 14 may be tall enough to fit larger food items and dishes. The top 14 may be translucent or opaque. The top 14 may be tinted various colors and shades, and/or included various patterns to commend itself for use in a variety of environments. As shown in FIGS. 1-4, the top 14 includes a series of through holes or vents, shown as apertures 16, connecting an interior chamber, shown as interior chamber 100 in FIG. 5, with the surrounding environment of the food-cooling device 10. The apertures 16 are shown as substantially round through-holes, but they may be slots, slits or vents having any of a variety of shapes and sizes to permit the movement of air from the interior chamber and the surrounding environment. While FIGS. 1-9 show the apertures 16 arranged in a repeating pattern of 3×3, the arrangement of the apertures 16 may vary. For example, the apertures 16 may be slits that extend substantially from the center to the bottom of the top 14. In some embodiments, the apertures 16 may be configurable in an open and a closed position, where in the closed position the apertures inhibit the flow of air between the outside environment and the interior chamber 100.

As shown in FIGS. 1-6 attached to the base 12 may be a plurality of legs or supports, shown as supports 20. The supports 20 may be circular. In other embodiments, the supports 20 may be rectangular with a length that extends substantially along a chord of the circle. For example, the base 12 of food-cooling device 10 may rest on two supports 20, one that extends substantially along a chord near the front of food-cooling device 10 and another that extends substantially along a chord near the rear of food-cooling device 10. According to an exemplary embodiment, the supports 20 may be made from anti-skid material (e.g., plastic, rubber, etc.). Additionally or alternatively, the legs may be made from a non-marking material. As shown in FIGS. 1-6 the supports 20 are shown to include four supports positioned in a square configuration to support the base 12. In other embodiments, the supports 20 include a different number of supports (e.g., 1 support, 2 supports, 3 supports, etc.). In other embodiments, the supports 20 are placed in a different configuration (e.g., three supports placed equidistant from the center and from each other, a plurality of supports disposed along the outer edge of base 12, etc.).

Figure 5:
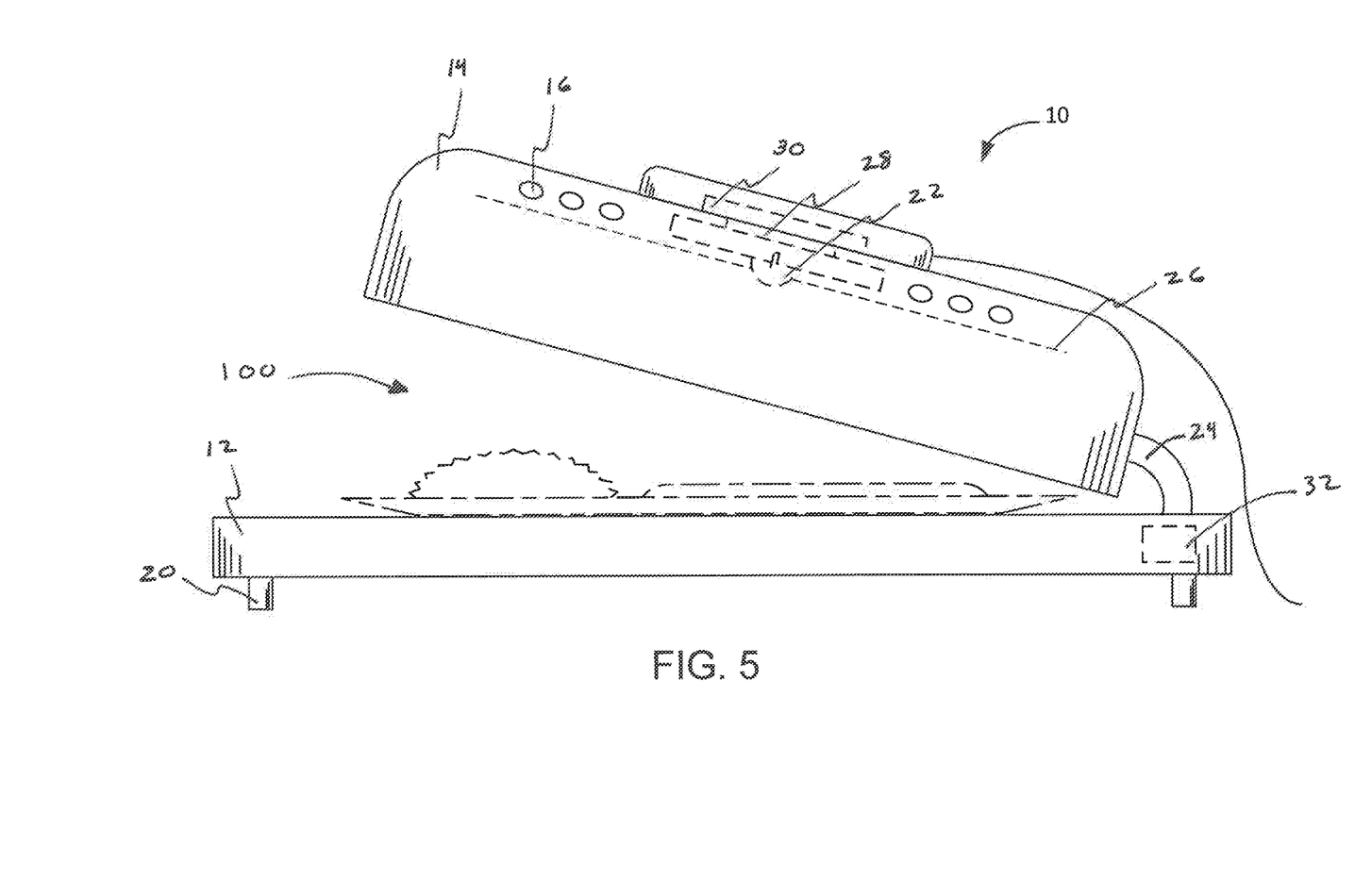
FIG. 5 is a side view of a food-cooling device with the top lifted up, according to an exemplary embodiment.
Figure 6:
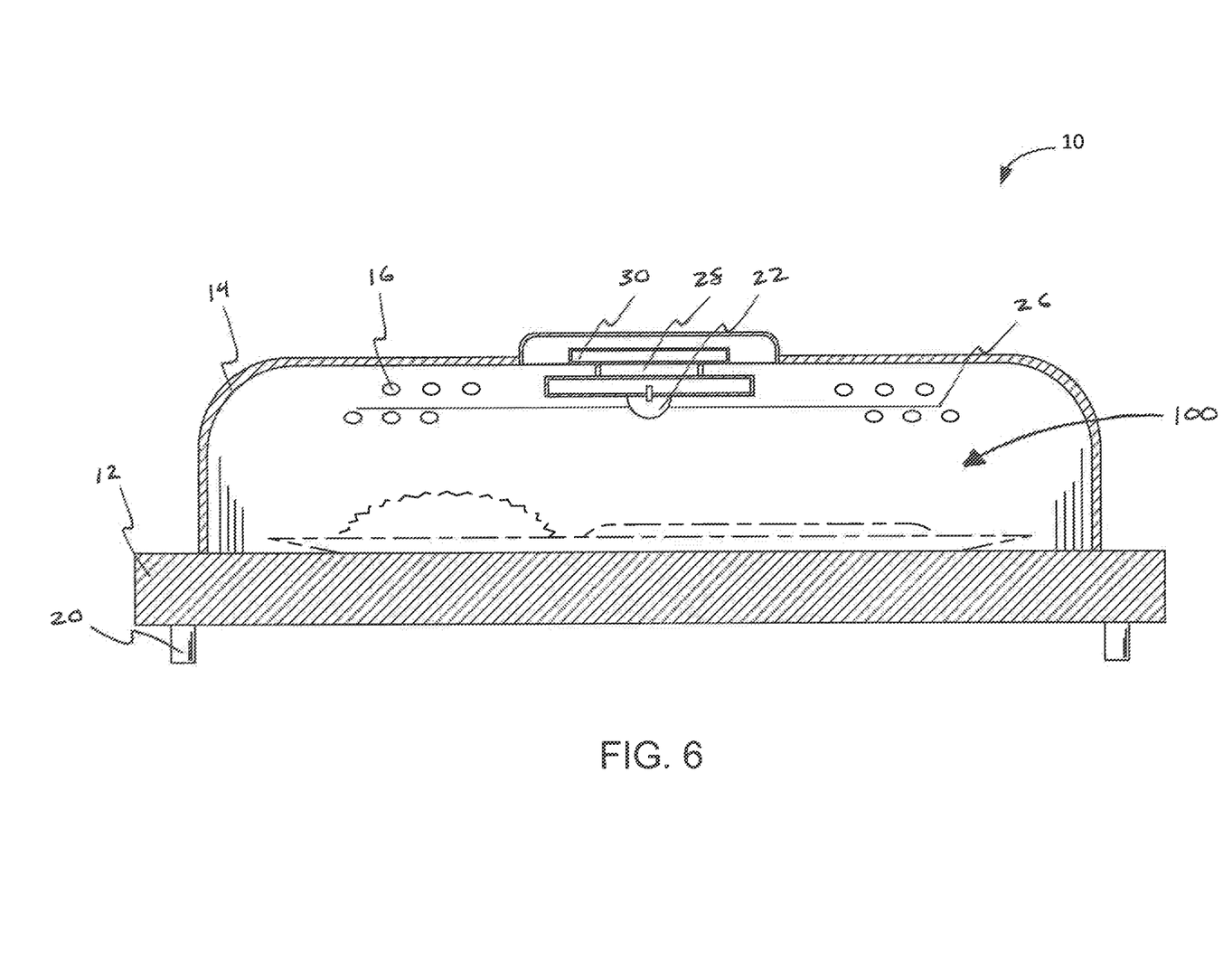
FIG. 6 is a cross-section view of a food-cooling device, according to an exemplary embodiment.

Referring now to FIGS. 5-8, the food-cooling device 10 is shown to include an interior chamber 100 defined by the base 12 and the top 14. As shown in FIG. 6, a cooling assembly, shown as fan 22, is coupled to an underside of top 14 and so that it occupies a portion of interior chamber 100. In some embodiments, the fan 22 is detachable from the top 14. In some embodiments, the fan 22 may be positioned in various other positions and orientations within the interior chamber 100 such that it passes air over a food item that is also contained within the interior chamber. In some embodiments, the fan 22 may move air from the surrounding environment of the food-cooling device 10 into the interior chamber 100 through the apertures 16. In other embodiments, the fan 22 may move air from the interior chamber 100 through the fan 22 to the outside environment, pulling air into the interior chamber 100 through the apertures 16. In some embodiments, the fan may move the air in one direction or another depending on its direction of rotation. Still in other embodiments, the fan may recirculate the air within the interior chamber 100 without substantial mixing with air from the outside environment. For example, in an embodiment where the apertures 16 are in the closed position, the fan 22 may move the air within the interior chamber 100 without drawing air through the fan 22 or the apertures 16. This may be useful for food items that are preferably cooled without the loss of moisture that may otherwise result from the movement of air over their surface. With the apertures 16 in a closed position, any steam is kept substantially within the interior chamber 100.

Figure 3:
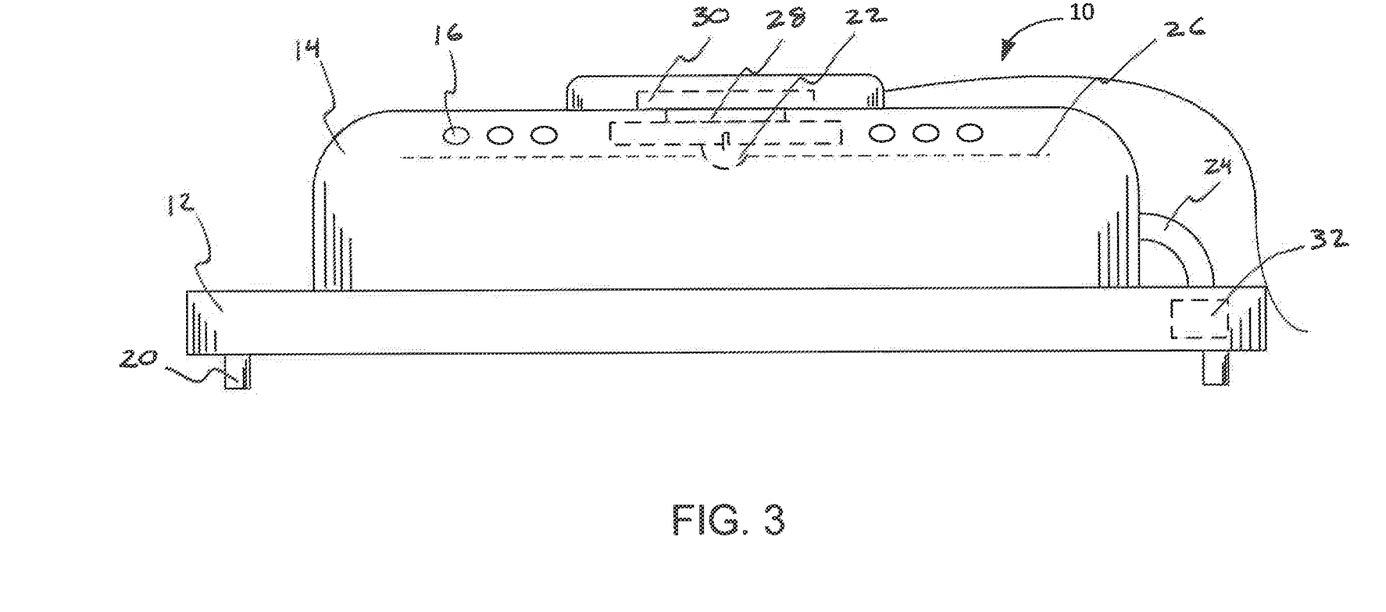
FIG. 3 is a side view of a food-cooling device, according to an exemplary embodiment.
Figure 7:
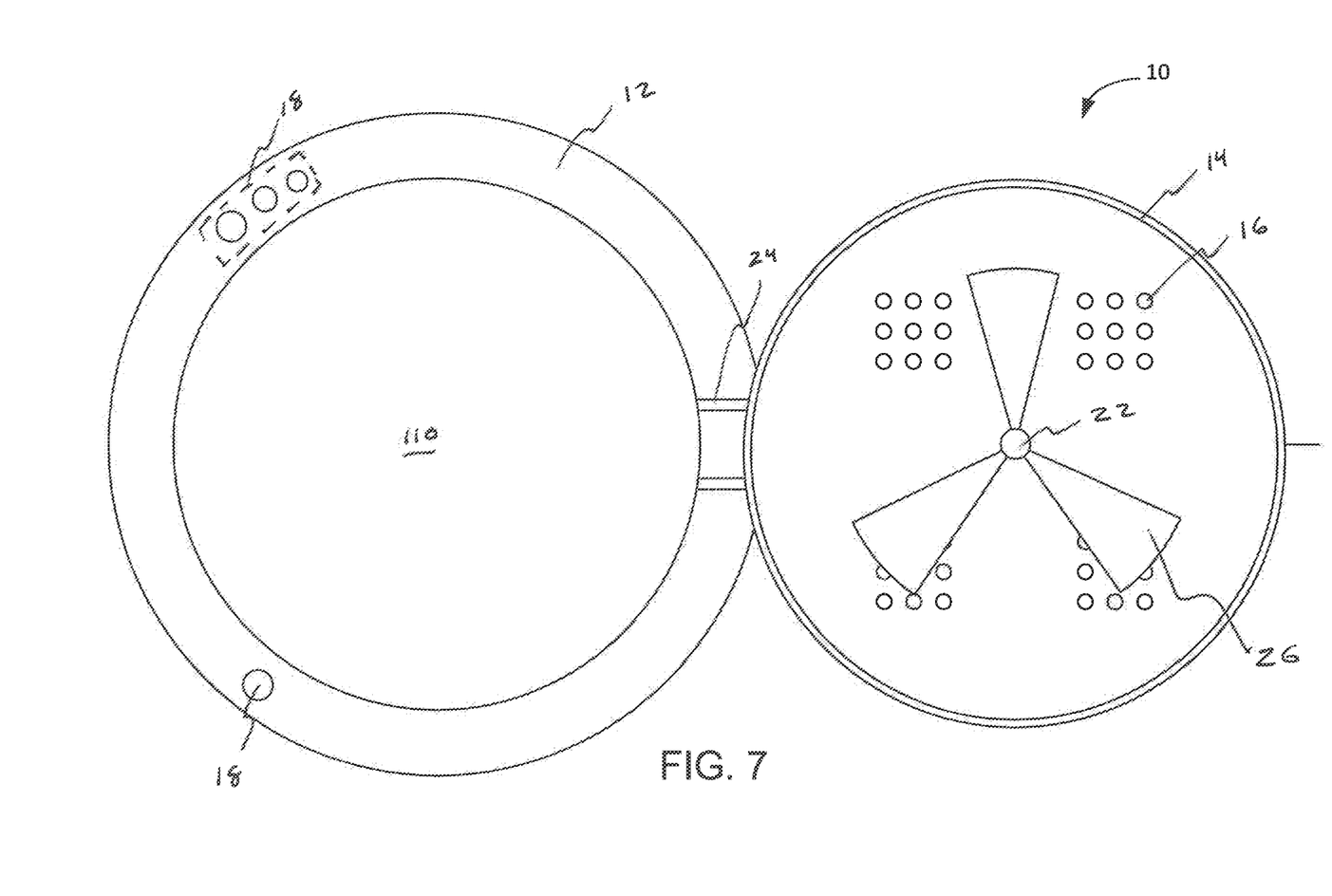
FIG. 7 is a top view of a food-cooling device with the top open, according to an exemplary embodiment.

The top 14 may be moved between a closed position (i.e. parallel with the base 12 and with the fan 22 above base 12), shown in FIG. 3, and an open position (i.e. with the fan 22 facing away from base 12), shown in FIG. 7. The top 14 may move relative to the base 12 between the closed position and open position, as shown in FIG. 5, and may move according to any type of connecting member capable of facilitating the rotation (e.g. a swivel, a hinge, etc.). For example, according to the exemplary embodiment shown in FIGS. 3-5, 7 and 9, the base 12 and the top 14 are connected by a connecting member shown as hinge 24.

Figure 8:
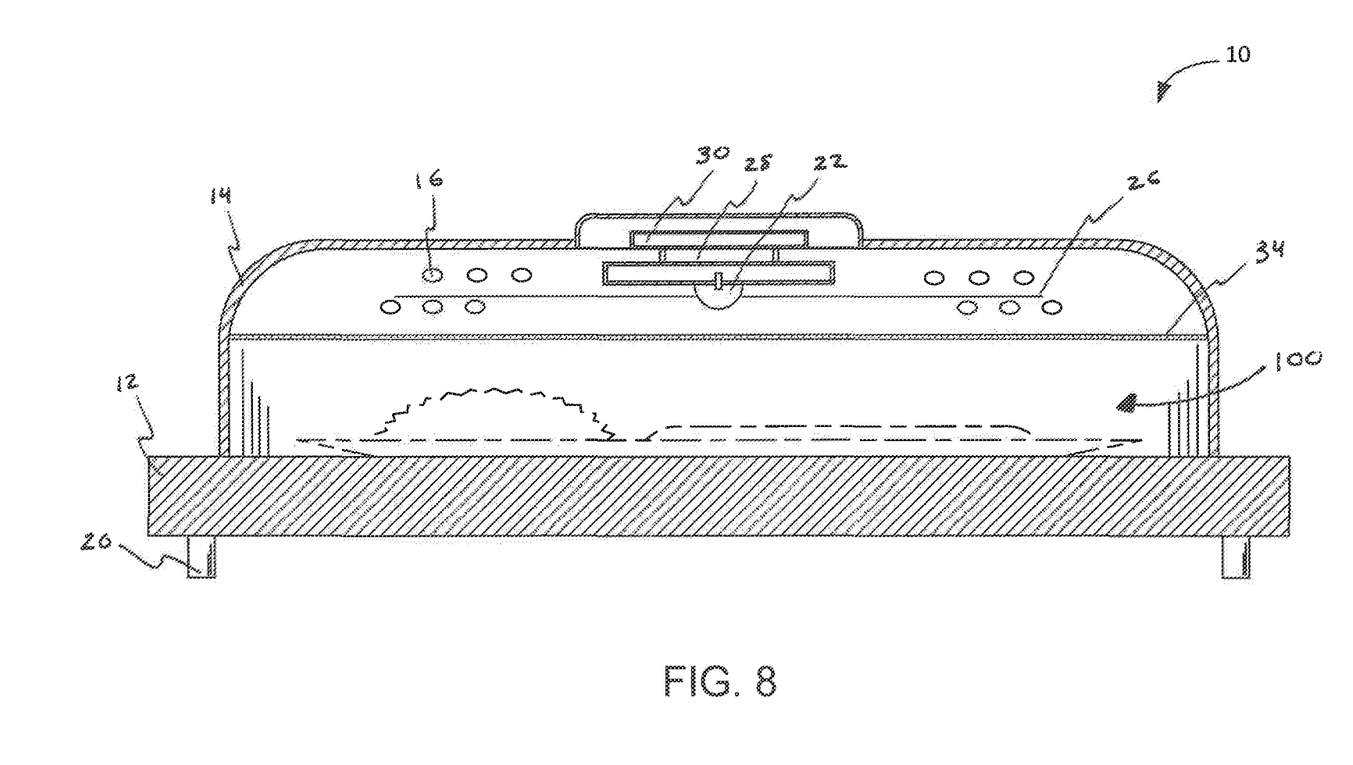
FIG. 8 is a cross-section view of a food-cooling device, according to an exemplary embodiment.
Figure 9:
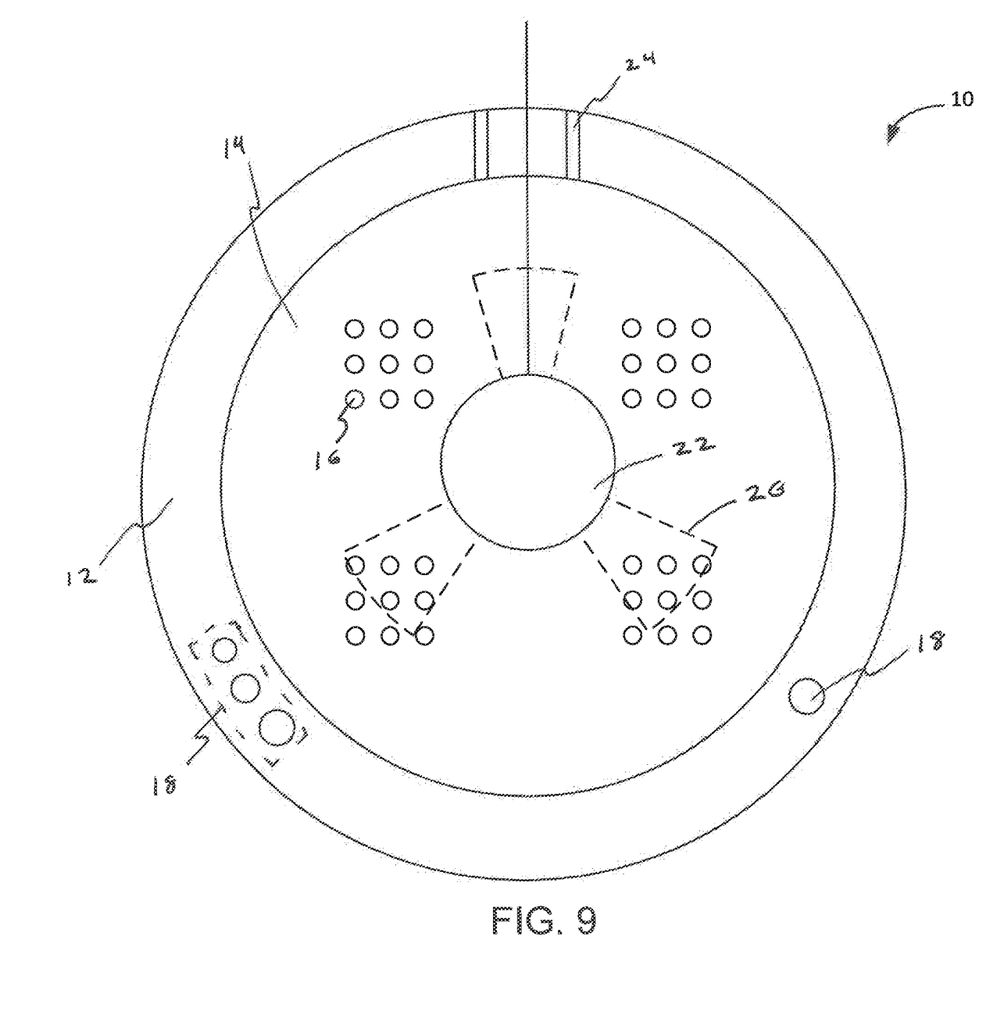
FIG. 9 is a top view of a food-cooling device, according to an exemplary embodiment.

Referring now to FIG. 7 the fan may have three blades, shown as fan blades 26. In other embodiments, the fan 22 may have fewer or more fan blades. According to an exemplary embodiment, the fan blades 26 may be shaped to draw air through the apertures 16 and onto the top of base 12, shown as area 110 in FIG. 7, where a food item may be placed. In other embodiments, the fan blades 26 may be shaped to pull air away from area 110 and through apertures 16. Referring now to FIG. 8, a food-cooling device 10 is shown with a barrier 34 between the fan 22 and the base 12. In some embodiments, the barrier 34 may be a screen or other type of perforated barrier that allows the passage of air from one side of the barrier to the other but inhibits the passage of larger items (i.e. food particles, fingers, etc.) For example, the barrier 34 may be a wire mesh screen that protects a user from the spinning blades of the fan 22 and protects the fan 22 from interacting with the food item and any pieces of food that may become dislodged in the cooling operation. The barrier 34 may have apertures of various size and shape that allow for the passage of air through barrier 34 while inhibiting the movement of larger particles and/or objects. For example, the barrier 34 may be composed of plastic and contain a plurality of circular apertures are too small for a finger to pass through, but large enough to allow sufficient airflow to maintain the cooling operation. In some embodiments, various components of the food-cooling device 10, such as the barrier 34, are removable by a user. For example, a user may remove barrier 34 and fan 22 for cleaning.

As shown in FIGS. 6 and 8 the fan is coupled to an electric motor, shown as motor 28. In some embodiments, the fan 22 is detachable from the motor 28 by a user. The motor 28 may be a variable-speed motor, allowing for the speed of the fan 22 to be controlled by a user. In other embodiments, motor 28 is electrically coupled to a variable frequency drive (a "VFD"). According to an exemplary embodiment, motor 28 is able to spin in opposite directions, thereby facilitating the bi-directional flow of air described above. As shown in FIG. 6, motor 28 can be configured to provide mechanical power (e.g., rotational kinetic energy) to fan 22. Electric motor 28 may be configured to consume or receive electrical energy from one or more batteries, power cells, capacitors, power storage devices, power storage systems, and/or the electric mains.

Figure 11:
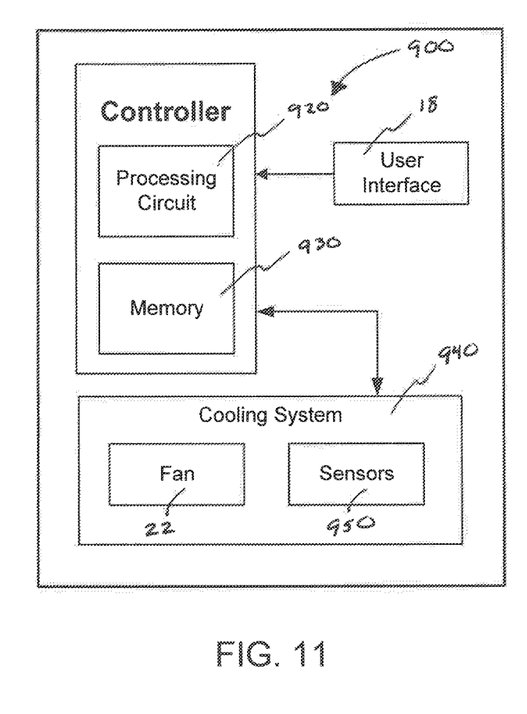
FIG. 11 is a block diagram of a controller for use in a food-cooling device, according to an exemplary embodiment.

As shown in FIGS. 6 and 8, fan 22 is coupled to a controller, shown as controller 30. According to an exemplary embodiment, the controller 30 is configured to selectively engage, disengage, control, and/or otherwise communicate with components of the food-cooling device 10. For example, the controller 30 is configured to switch the fan 22 into an operating mode when a cooling parameter input from the user interface 18 is received, and to switch the fan 22 to an off mode when that cooling parameter is met. Referring now to FIG. 11, the controller, shown as controller 900, is coupled to the user interface 18 and cooling system 940. Cooling system 940 includes the fan 22 and sensors 950. According to an exemplary embodiment, the controller 900 is configured to receive temperature data from the sensors 950 regarding the temperature of a food item placed within interior chamber 100. The controller is configured to actively control the fan 22 according to the input received (i.e. the cooling parameter) from the user interface 18 in order to regulate the temperature of the food item within the interior chamber.

The controller 900 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. According to the exemplary embodiment shown in FIG. 11, the controller 900 includes a processing circuit 920 and a memory 930. The processing circuit 920 may include an ASIC, one or more FPGAs, a DSP, circuits containing one or more processing components, circuitry for supporting a microprocessor, a group of processing components, or other suitable electronic processing components. In some embodiments, the processing circuit 920 is configured to execute computer code stored in the memory 930 to facilitate the activities described herein. The memory 930 may be any volatile or non-volatile computer-readable storage medium capable of storing data or computer code relating to the activities described herein. According to an exemplary embodiment, the memory 930 includes computer code modules (e.g., executable code, object code, source code, script code, machine code, etc.) configured for execution by the processing circuit 920.

The sensors 950 may include one or more temperature sensors (e.g., a thermistor, infrared sensor, etc.) positioned to facilitate monitoring the temperature of the food item within the interior chamber 100. For example, a temperature sensor may be positioned within interior chamber 100 to monitor the temperature of food items placed within the interior chamber 100. According to an exemplary embodiment, multiple temperature sensors are included in food-cooling device 10. For example, one temperature sensor may be positioned to facilitate monitoring the temperature the food item within the interior chamber 100, and another temperature sensor is positioned to facilitate monitoring of the temperature of the environment surrounding the food-cooling device 10. Still in other embodiments, the sensor(s) 950 may be placed anywhere on the food-cooling device 10 to measure the temperature of a food item within interior chamber 100. Referring still to FIG. 11, while sensors 950 are shown to be separate from controller 90, in some embodiments, the sensors 950 may be included within the controller 900.

In some embodiments, the sensors 950 may also include one or more detection sensors configured to detect the position of the top 14 relative to the base 12. According to an exemplary embodiment, referring back now to FIGS. 1-9, the controller 30 is configured to determine the position of the top 14 as it relates to the base 12 using the detection sensors 950, and to modify the operation of the fan based on that position. For example, the controller 30 may be configured to prohibit the activation of the fan 22 when the top 14 is in an open position as shown in FIG. 7. In some embodiments, the controller may be configured to deactivate the fan 22 when it determines that the top 14 is in motion. For example, the fan 22 may be activated when a user moves the top 14 from the closed position to the open position to remove the food item within interior chamber 100 before the cooling operation is complete. The controller 30 detects the movement of the top 14 relative to the base 12 and terminates the cooling operation, disengaging the fan and returning to a standby mode, thereby facilitating safer operation of the food-cooling device ensuring the fan does not run while the fan is exposed.

Figure 4:
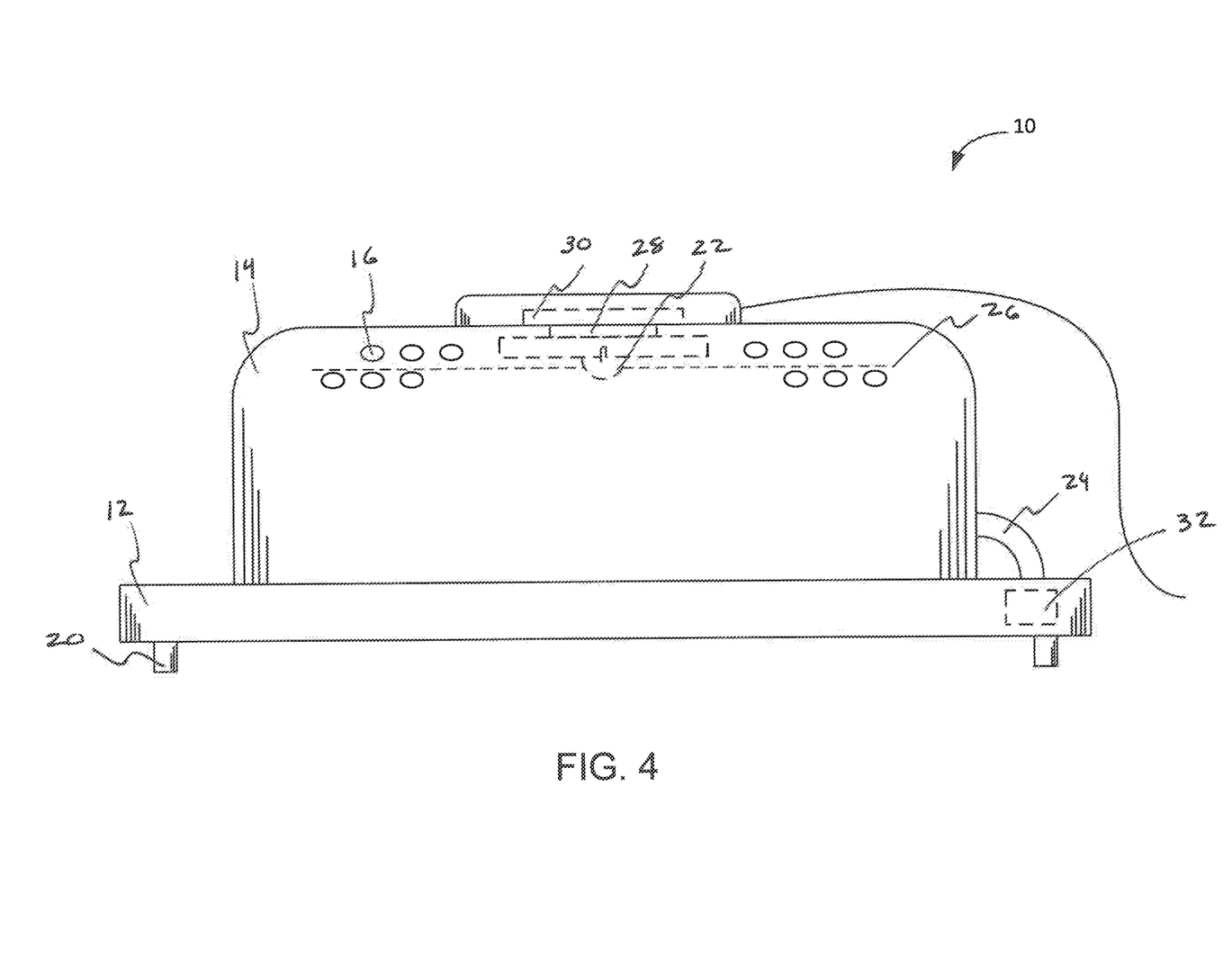
FIG. 4 is a another side view of a food-cooling device, according to an exemplary embodiment.

According to the exemplary embodiments shown in FIGS. 3-5, the controller 30 may also be connected to locking mechanism 32 as shown. The locking mechanism 32 is coupled to hinge 24 so that it can control the rotation of the top 14. The controller 30 may be configured to active locking mechanism 32 when the top 14 is in the closed position and the fan 22 is activated, thereby preventing a user from possibly injury by coming into contact with the moving fan 22. The controller 30 may then unlock the locking mechanism 32 when the cooling operation is completed, allowing a user to access interior chamber 100.

According to an exemplary embodiment as shown in FIG. 1, the food-cooling device 10 includes a user interface, shown as user interface 18, to allow a user to control the operation of the food-cooling device 10 and its various components. The user interface 18 may allow a user to select a cooling parameter. The controller 30 receives the cooling parameter selected by the user, and is configured to switch the fan from an operating mode to an off mode when the cooling parameter is met. As shown in FIG. 1 the user-interface 18 is a series of buttons (e.g., a stop button configured to turn the unit off, buttons allowing a user to set a target temperature or run-time, buttons to operate according to a pre-installed setting, etc.). In some embodiments, the user can control the fan directly just by operating an on/off button. In other embodiments, the user interface 18 may include other means for a user to interact with a device. For example, the user interface 18 may include at least one of an interactive display, a touchscreen device, levers, and switches. In fact most any switch or combination of switches or switch-like devices capable of providing alone or in combination discrete inputs as described below in further detail are possible (e.g., a rotary switch with multiple detent positions, a lever, a sliding-knob, a capacitive touch switch, etc.).

Figure 12A:
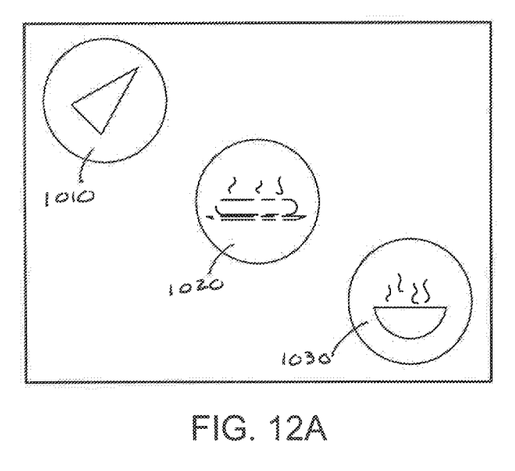
FIGS. 12A and 12B are various views of a user interface for use in a food-cooling device of FIG. 1, according to exemplary embodiments.

The cooling parameter selected by a user through the user interface 18 may be a desired temperature for a food item or a desired time for operation of the fan 22. According to an exemplary embodiment, the user interface 18 includes a power button and one or more buttons that correspond to various cooling parameters that are indicative of a desired temperature for discrete food types. For example, referring now to FIG. 12A, one button may include on its face a representation of a pizza, shown as button 1010, one button may include on its face a representation of a piece of meat, shown as button 1020, and one button may include on its face a representation of a bowl of soup, shown as button 1030. Each button representing each discrete food type corresponds to preset desired temperature endpoints. When a user selects a button, the controller 30 receives the input of the cooling parameter (i.e. the desired temperature endpoint) from the user interface 18 and operates the fan 22 until the temperature sensors 950 indicate the temperature of the food item is substantially equal to the preset desired temperature endpoint selected, at which point the controller may switch the fan 22 from an operating mode to an off mode. For example, button 1010 with a representation of a pizza on its face may correspond to a desired temperature endpoint of 170 degrees Fahrenheit. After a user selects button 1010 the controller is configured to operate the fan 22 until the temperature sensor 950 detects that the temperature of the food item is substantially equal to 170 degrees Fahrenheit, at which point the controller switches the fan 22 from an operating mode to an off mode. In some embodiments, the controller may then initiate a notification to the user that the cooling operation is completed. While only three discrete food types are shown, it should be understand any number of buttons and/or discrete settings may be used without departing from the invention. In some embodiments, the user may be able to adjust the desired temperature endpoint related to each button and/or each food type to fit a personal preference.

Figure 12B:
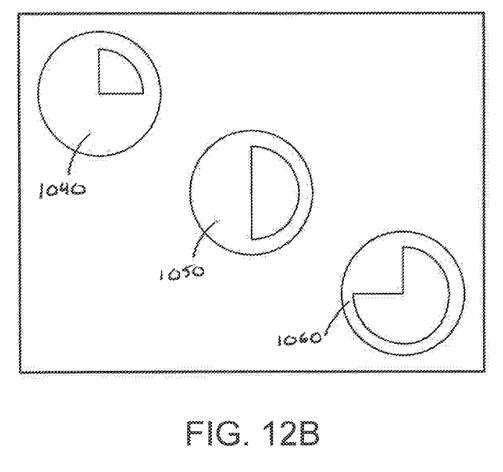

According to another exemplary embodiment, the user interface 18 includes a series of buttons that each correspond to cooling parameters that represent discrete time intervals. For example, referring now to FIG. 12B, a first button may correspond to 15 seconds, shown as button 1040, a second button may correspond to 30 seconds, shown as button 1050, and a third button may correspond to 45 seconds, shown as button 1060, and controller 30 is configured to switch the fan 22 to the operating mode for the indicated time and then switch the fan 22 to an off mode when the indicated time elapses. For example, a user may select the first button indicating a 15 second time interval and controller 30 will engage the fan 22 (i.e. switch the fan 22 to an operating mod) for the selected 15 second time interval. While only three discrete time intervals are shown, it should be understand any number of buttons and/or discrete settings may be used without departing from the invention, and the example times used within should not be considered limiting. In some embodiments, the user interface 18 merely includes a button that engages and disengages the fan 22. Still in other embodiments, the user interface 18 includes various series of buttons, some indicating food types with temperature endpoints and some indicating time intervals. In some embodiments, the user interface may allow the user to adjust the time intervals. For example, the user interface may include a rotatory switch that allows a user to select an operating time. The user would rotate the switch to the desired amount of time and then turn on the fan 22, and the fan would operate until the time has elapsed. It should be understood by one of ordinary skill in the art that the user interface 18 may include other means for a user to interact with the device and adjust the cooling parameters and/or time limits that govern the operation of the fan 22.

According to an exemplary embodiment, the controller 30 may be configured to operate according to signals received from the user interface 18 unless they contravene pre-installed limits. For example, the controller 30 may be configured to turn off the fan 22 when it determines it can no longer cool a food item any further. The controller would determine that it could no longer cool a food item if the temperature signal from the temperature sensor 950 has remained substantially constant for a period. In other embodiments, the controller may be configured to turn off the fan 22 when a maximum running time is reached. For example, the controller 30 may deactivate the fan 22 after 10 minutes and require a successive input from a user to continue operating.

According to an exemplary embodiment, the user interface 18 includes a notification device (e.g., alarm, light, display, etc.) that notifies the operator when the food-cooling device is on, off, in a standby mode, or has completed a selected cooling operation. For example, when a desired temperature endpoint is reached, the user interface 18 may include an LED that will flash and thereby indicate to a user that the operation is completed. In some embodiments, a display of the user interface 18 shows a current temperature of the food item within the interior chamber 100.

The above modes, time intervals, limits, and/or notifications may each aide a user be they a child or an elder, who may be forgetful and neglect the food-cooling device 10 after it is activated, and thereby without such controls in place, leave it to operate in perpetuity.

Figure 10:
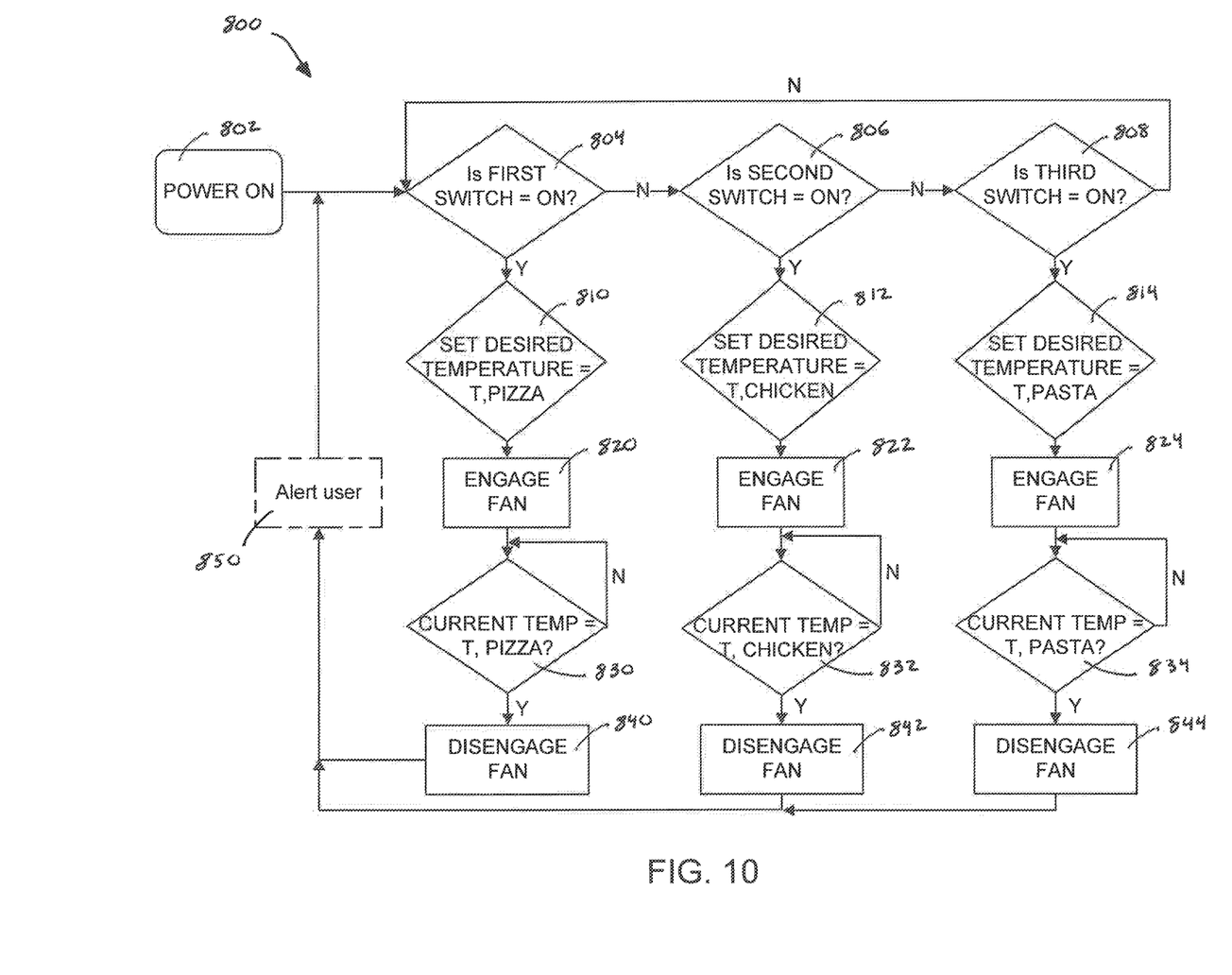
FIG. 10 is a process for cooling a food item using a food-cooling device, according to an exemplary embodiment.

Referring now to FIG. 10, a flow chart illustrating exemplary method logic for the controller 30 in accordance with an exemplary embodiment of the invention. At 802, the process begins with the food-cooling device being powered on. The controller 30 waits until a switch, be it first switch 804, second switch 806, or third switch 808 is pressed. Assuming for the sake of explanation the first switch 804 is pressed, the controller 30 then sets the desired temperature endpoint at TPIZZA at 810. The controller 30 then engages the fan 22 at 820, and at 830, the controller monitors the temperature of the food item using the temperature sensors 950 to determine if the current temperature of the food item equals the desired temperature endpoint, TPIZZA. If the answer at 830 is no, the fan continues to operate until the answer at 830 is yes. When the answer at 830 is yes, the controller 30 disengages the fan 22. The controller 30 then returns back to state 802.

In some embodiments, the controller 30 may alert a user at 850 before returning to 802 that the desired temperature endpoint has been reached and the fan is disengaged. The alert may be an audio alert (e.g., an alarm), or a visual alert (e.g., a notification light, a flashing light, etc.). In some embodiments, the alert may additionally or alternatively include releasing the top 14 from its position above the base 12 to provide an indication to a user that the cooling operation is completed.

Figure 13:
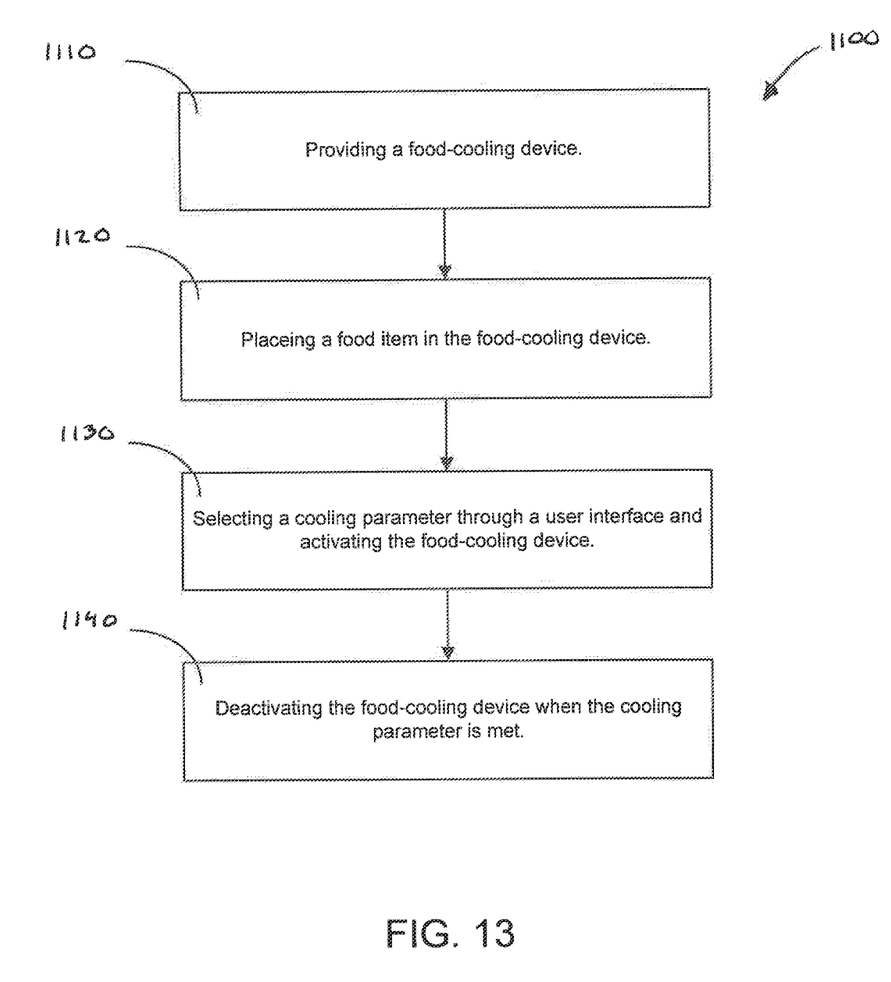
FIG. 13 is a process for cooling food, according to an exemplary embodiment.

Referring now to FIG. 13, an exemplary embodiment of a process 1100 for cooling food using a food-cooling device as described above is shown. Step 1110 includes providing a food-cooling device as described above.

Step 1120 includes placing a food item in the food-cooling device. The food item may be any food item that can fit within the interior chamber 100. While the above focuses on using the food-cooling device to cool hot foods, it should also be understand by those of skill in the art that the same device and method may be used to facilitate the warming of items that may be too cold. It should also be appreciated that while the above method contemplates using the food-cooling device to cool hot foods, it may be used in other scenarios where moving air is also desired (e.g., drying operations, etc.).

Step 1130 includes selecting a cooling parameter through a user interface and activating the food-cooling device. As described above with reference to FIGS. 1-7 the user interface 18 of the food-cooling device 10 may include various user inputs, shown as a plurality of buttons 18, which correspond to various cooling parameters. In some embodiments, the cooling parameters the buttons of user interface 18 correspond to are desired temperature endpoints for various food types. In some embodiments, the cooling parameters are time intervals.

Step 1140 includes deactivating the food-cooling device when the cooling parameter is met. For example, when the cooling parameter is a desired temperature endpoint, the food-cooling device may deactivate when the temperature of the food item substantially equals the desired temperature endpoint. For further example, when the cooling parameter is a time interval, the cooling device may deactivate when the time interval has elapsed, regardless of the temperature of the food item.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X; Y; Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. In addition, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the food-cooling device 10 and the systems and components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. An apparatus for cooling a food item, the apparatus comprising:
    a base;
    a top, the top and the base defining an interior chamber configured to receive the food item;
    a fan coupled to the top and configurable in an operating mode and an off mode, wherein the fan moves air within the interior chamber when in the operating mode;
    a temperature sensor configured to measure a temperature of the food item within the interior chamber and provide a temperature signal representative of the temperature of the food item;
    at least one user input allowing a user to select a cooling parameter; and
    a control unit adapted to receive the temperature signal from the temperature sensor and the cooling parameter from the at least one user input, wherein the control unit is configured to switch the fan from the operating mode to the off mode when the cooling parameter has been met.

2. The apparatus of claim 1, wherein the top comprises one or more apertures fluidly connecting the interior chamber and a surrounding environment.

3. The apparatus of claim 1 further comprising:
    a connecting member attached to the top and to the base, wherein the connecting member is configured to allow the top to rotate relative to the base, the connecting member further configured to lock the position of the top in a closed position with respect to the base while the fan is in the operating mode.

4. The apparatus of claim 3, wherein the connecting member is further configured to be releasable by a user.

5. The apparatus of claim 1, wherein the cooling parameter is a desired temperature endpoint.

6. The apparatus of claim 5, wherein the at least one user input comprises:
    a first user input corresponding to a first desired temperature endpoint;
    a second user input corresponding to a second desired temperature endpoint; and
    a third user input corresponding to a third desired temperature endpoint, wherein the first, second, and third desired temperature endpoints each correlates to a food type.

7. The apparatus of claim 5, wherein the control unit is configured to switch the fan from the operating mode to the off mode when the temperature signal indicates the temperature of the food item is substantially unchanged for a period of time.

8. The apparatus of claim 1, wherein the cooling parameter is a desired elapsed time.

9. The apparatus claim 8, wherein the at least one user input comprises:
    a first user input indicating a first desired elapsed time of 15 seconds;
    a second user input indicating a second desired elapsed time of 30 seconds; and
    a third user input indicating a third desired elapsed time of 1 minute.

10. The apparatus of claim 1, wherein the control unit further comprises:
    means for notifying a user when the fan is deactivated.

11. The apparatus of claim 1, wherein the at least one user input corresponds to at least one temperature endpoint and a reverse setting, wherein the control unit is configured upon receipt of the reverse setting from the at least one user input to control the fan to spin in reverse until the temperature signal is substantially equal to the at least one temperature endpoint.

12. The apparatus of claim 1 wherein the least one user input is adapted to set at least one fan speed threshold and wherein the control unit is further adapted to limit a speed of the fan to the at least one fan speed threshold indicated by the at least one user input.

13. The apparatus of claim 12, wherein the at least one user input comprises:
    a first user input indicating a low fan speed;
    a second user input indicating a medium fan speed; and
    a third user input indicating a high fan speed.

14. A method of cooling a food item, the method comprising:
    placing the food item into an apparatus for cooling the food item, the apparatus comprising:

a base;

a top, the top and the base defining an interior chamber configured to receive the food item;

a fan coupled to the top and configurable in an operating mode and an off mode, wherein the fan moves air within the interior chamber when in the operating mode;

a temperature sensor configured to measure a temperature of the food item within the interior chamber and provide a temperature signal representative of the temperature of the food item;

at least one user input allowing a user to select a cooling parameter;

a control unit adapted to receive the temperature signal from the temperature sensor and the cooling parameter from the at least one user input, wherein the control unit is configured to switch the fan from the operating mode to the off mode when the cooling parameter has been met;

selecting a cooling parameter for the food item by the at least one user input; and switching the fan from the operating mode to the off mode when the cooling parameter is met.

15. The method of claim 14, wherein the cooling parameter is a desired temperature endpoint.

16. The method of claim 15, wherein the at least one user input comprises:

a first user input corresponding to a first desired temperature endpoint;

a second user input corresponding to a second desired temperature endpoint; and a third user input corresponding to a third desired temperature endpoint, wherein the first, second, and third desired temperature endpoints each correlate to a food type.

17. The method of claim 14 wherein the control unit is configured to switch the fan from the operating mode to the off mode when the temperature signal indicates the temperature of the food item is substantially constant for a period of time.

18. The method of claim 14, wherein the cooling parameter is a desired elapsed time.

19. The method of claim 18, wherein the at least one user input comprises:

a first user input indicating a first desired elapsed time of 15 seconds;

a second user input indicating a second desired elapsed time of 30 seconds; and a third user input indicating a third desired elapsed time of 1 minute.

20. The method of claim 14, wherein the control unit further comprises:

means for notifying a user when the fan is deactivated.

* * * * *